United States Patent
Xie

(10) Patent No.: US 12,485,863 B2
(45) Date of Patent: Dec. 2, 2025

(54) SENSOR ASSEMBLY FOR A VEHICLE AND MULTI-CIRCUIT BRAKING SYSTEM

(71) Applicant: Robert Bosch GmbH, Stuttgart (DE)

(72) Inventor: Fei Xie, Gemmrigheim (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 17/927,492

(22) PCT Filed: May 25, 2021

(86) PCT No.: PCT/EP2021/063851
§ 371 (c)(1),
(2) Date: Nov. 23, 2022

(87) PCT Pub. No.: WO2021/239706
PCT Pub. Date: Dec. 2, 2021

(65) Prior Publication Data
US 2023/0202441 A1    Jun. 29, 2023

(30) Foreign Application Priority Data

May 26, 2020   (DE) ...................... 10 2020 206 566.7

(51) Int. Cl.
*B60T 8/88*     (2006.01)
*B60T 8/171*    (2006.01)
(Continued)

(52) U.S. Cl.
CPC .............. *B60T 8/885* (2013.01); *B60T 8/171* (2013.01); *B60T 8/1755* (2013.01);
(Continued)

(58) Field of Classification Search
CPC .... B60T 8/171; B60T 8/1755; B60T 8/17616; B60T 8/32; B60T 8/96; B60T 8/885;
(Continued)

(56) References Cited

U.S. PATENT DOCUMENTS

| | | | | |
|---|---|---|---|---|
| 4,546,437 A | * | 10/1985 | Bleckmann | B60T 8/885 |
| | | | | 303/DIG. 9 |
| 5,684,702 A | * | 11/1997 | Phillips | B60T 8/885 |
| | | | | 701/78 |

(Continued)

FOREIGN PATENT DOCUMENTS

| | | |
|---|---|---|
| DE | 100 28 094 A1 | 12/2001 |
| DE | 10 2015 110 965 A1 | 1/2016 |

(Continued)

OTHER PUBLICATIONS

International Search Report corresponding to PCT Application No. PCT/EP2021/063851, mailed Aug. 19, 2021 (German and English language document) (6 pages).

*Primary Examiner* — Thomas J Williams
(74) *Attorney, Agent, or Firm* — Maginot, Moore & Beck LLP

(57) ABSTRACT

A sensor assembly includes control devices with evaluation and control units, and multiple sensor elements which are each assigned to a brakeable vehicle wheel and one of the evaluation and control units and designed to detect a physical variable of the associated wheel and to output same as an output signal directly to the associated evaluation and control unit, wherein the control devices are each designed to carry out a braking function of the vehicle based on the detected movement-dependent physical variables of the vehicle wheels, wherein the individual evaluation and control units are designed to output the received output signal to a respective evaluation and control unit of another control device, such that the individual evaluation and control units each receive the output signals from at least two sensor elements, which are assigned to evaluation and control units of different control devices, and prepare same for evaluation.

14 Claims, 1 Drawing Sheet

(51) Int. Cl.
  *B60T 8/1755* (2006.01)
  *B60T 8/1761* (2006.01)
  *B60W 10/08* (2006.01)
  *B60W 30/10* (2006.01)

(52) U.S. Cl.
  CPC ..... *B60T 8/17616* (2013.01); *B60T 2270/402* (2013.01); *B60T 2270/413* (2013.01); *B60T 2270/414* (2013.01); *B60W 10/08* (2013.01); *B60W 30/10* (2013.01)

(58) Field of Classification Search
  CPC ......... B60T 2270/402; B60T 2270/413; B60T 2270/414; B60W 10/08; B60W 10/184; B60W 30/10
  See application file for complete search history.

(56) References Cited

U.S. PATENT DOCUMENTS

| | | | | |
|---|---|---|---|---|
| 6,299,261 | B1 * | 10/2001 | Weiberle | B60T 13/74 |
| | | | | 303/122.04 |
| 6,410,993 | B1 * | 6/2002 | Giers | B60T 8/321 |
| | | | | 303/20 |
| 2006/0064274 | A1 * | 3/2006 | Goebel | G01P 3/489 |
| | | | | 702/145 |
| 2015/0191159 | A1 * | 7/2015 | Akamine | B60L 7/18 |
| | | | | 701/22 |
| 2018/0236988 | A1 * | 8/2018 | Shimanaka | B60T 7/20 |
| 2018/0290642 | A1 * | 10/2018 | Tschiene | B60T 8/885 |
| 2019/0184953 | A1 * | 6/2019 | Ishida | B60T 8/326 |
| 2019/0375384 | A1 * | 12/2019 | Cho | B60T 8/885 |
| 2020/0039485 | A1 * | 2/2020 | Satoh | B60T 8/17 |
| 2021/0055323 | A1 * | 2/2021 | Wirth | B60T 8/885 |
| 2023/0202435 | A1 * | 6/2023 | Schmidt | B60T 7/12 |
| | | | | 701/70 |
| 2023/0202441 | A1 * | 6/2023 | Xie | B60T 8/171 |
| | | | | 303/20 |

FOREIGN PATENT DOCUMENTS

| | | |
|---|---|---|
| DE | 10 2015 209 565 A1 | 12/2016 |
| DE | 10 2018 204 615 A1 | 10/2019 |
| EP | 1 227 007 A2 | 7/2002 |
| EP | 2 340 975 A1 | 7/2011 |
| JP | 2006-521948 A | 9/2006 |
| JP | 2018-518412 A | 7/2018 |
| WO | 2020/071345 A1 | 4/2020 |

* cited by examiner

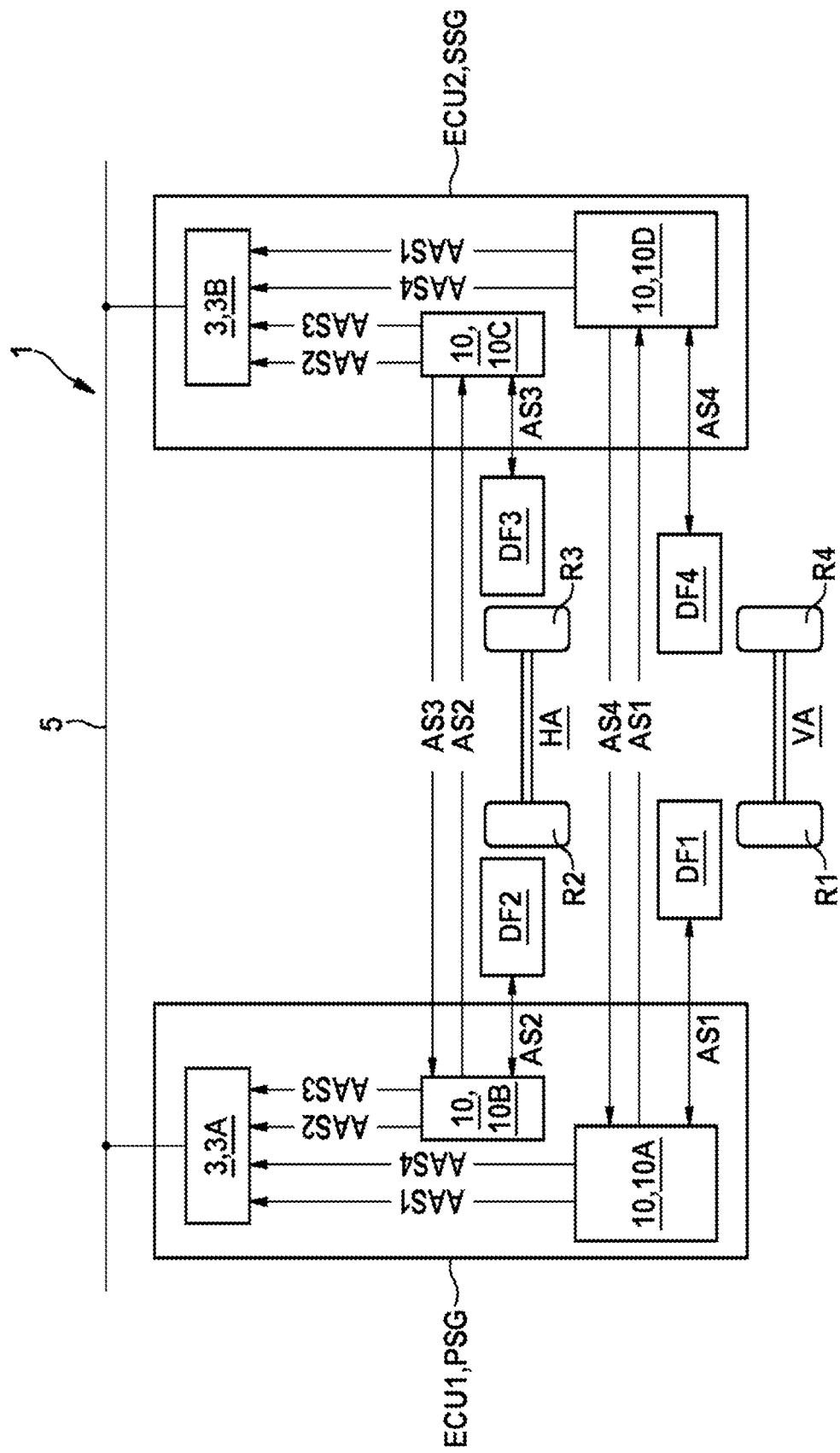

SENSOR ASSEMBLY FOR A VEHICLE AND MULTI-CIRCUIT BRAKING SYSTEM

This application is a 35 U.S.C. § 371 National Stage Application of PCT/EP2021/063851, filed on May 25, 2021, which claims the benefit of priority to Serial No. DE 10 2020 206 566.7, filed on May 26, 2020 in Germany, the disclosures of which are incorporated herein by reference in their entirety.

The disclosure relates to a sensor assembly for a vehicle, having at least two control devices, which each comprise at least one evaluation and control unit, and a plurality of sensor elements which are each associated with a brakeable vehicle wheel and are designed to detect at least one physical variable of the associated vehicle wheel and to output said variable as an output signal. The control devices are each designed to carry out at least one braking function of the vehicle based upon the detected physical variables of the vehicle wheels. The disclosure also relates to a corresponding multi-circuit braking system having such a sensor assembly.

BACKGROUND

For a highly-automated or autonomous driving mode and for partially automated or partially autonomous driving functions, redundancies are typically required to ensure the availability of sensors and functions even in the event of various faults. Therefore, a braking system with a primary and secondary stabilization of the vehicle is typically used. Specifically, two independent brakes or brake control systems are typically used for braking purposes. Both should ideally receive rotational speed information from rotational speed sensors, each associated with a vehicle wheel, with a high availability. In today's solutions, the rotational speed sensors are directly connected point-to-point to a primary control device. In a two-box-system approach, such as an ESP system as a primary system and an electromechanical or another electrical brake booster as a secondary system, or an integrated braking system (IPB) as a primary system and a redundant braking system RBU (RBU: Redundant Brake Unit) as a secondary system, the sensor signals of the rotational speed sensors are either looped through the primary control device to the secondary control device, which requires additional effort and costs, and also does not cover all faults, or the rotational speed sensors are switched by a switchover device, in the event of a fault, between the primary control device and the secondary control device. Another known solution provides for eight rotational speed sensors, of which four are connected directly to the primary control device and four are directly connected to the secondary control device. Due to this arrangement, two rotational speed sensors are installed on each wheel, so that the systems can stabilize the vehicle in a reliable manner. This means that, in total, eight rotational speed sensors per vehicle must be used, resulting in twice the cost for sensors and cabling.

DE 10 2015 209 565 A1 describes a method and a device for operating a motor vehicle. The device comprises an input for an external rotational speed sensor, a first control device, a second control device with a rotational speed detection device for each rotational speed sensor, and a computer device by means of which rotational wheel speeds can be determined. In this case, the rotational speed signals of the rotational speed detection devices can be fed to the first control device and to outputs of the device, wherein the rotational speed detection directions are functionally decoupled from one another, and wherein the second control device is functionally decoupled from the first control device and from the computing unit. As a result, each individual channel of a rotational speed detection system is designed to be redundant and wake-up capable. In the event that the device is defective, the wheel rotational speeds can still be available for other control devices that can be connected to the outputs of the device—for example, for controlling a secondary braking system. This is achieved by virtue of the fact that the rotational speed detection directions act as splitters which distribute the rotational speed signals to a plurality of users.

DE 10 2015 110 965 A1 discloses an autonomous vehicle control subsystem comprising a first and a second brake control module, said modules being communicatively and electrically connected to one another, and a plurality of wheel speed sensors. In this case, a first subset of the wheel speed sensors including at least a first of the wheel speed sensors is communicatively connected to the first brake control module and not to the second brake control module, and a second subset of the wheel speed sensors including at least a second of the wheel speed sensors is communicatively connected to the second brake control module and not to the first brake control module. During a typical operation of the vehicle and the autonomous vehicle control subsystem, the brake control modules communicate with each other to provide rotational wheel speed data from various sensors, wherein each of the brake control modules are able to perform operations for controlling the brakes of the vehicle. However, if a fault, e.g., energy loss, occurs in one of the brake control modules, the other vehicle control subsystem has at least some rotational wheel speed data, i.e., wheel speed data from at least one wheel speed sensor.

SUMMARY

The sensor assembly for a vehicle having the features of the disclosure and the corresponding multi-circuit braking system have the advantage that a redundant sensor element concept with standard sensor elements, which are preferably designed as a rotational speed sensor, and without a switching device, can be realized, a result of which costs for double rotational speed sensors and cabling can be saved. In addition, circuit parts can be saved in the two control devices. In a preferred embodiment of the sensor assembly having four speed sensors and four evaluation and control units on two control devices, a handover or takeover of the sensor elements between the two control devices without an additional switchover device and without latency is possible in the event of a fault because both control devices can simultaneously receive and evaluate the output signals of the four rotational speed sensors.

Embodiments of the present disclosure provide a sensor unit for a vehicle, having at least two control devices, which each comprise at least one evaluation and control unit, and a plurality of sensor elements, each of which is associated with a brakeable vehicle wheel and one of the evaluation and control units of the control devices and is designed to detect at least one physical variable of the associated vehicle wheel and to directly output said variable as an output signal to the associated evaluation and control unit. The control devices are each designed to carry out at least one braking function of the vehicle based upon the detected, movement-dependent, physical variables of the vehicle wheels. The individual evaluation and control units are designed to output the received output signal respectively to at least one evaluation and control unit of another control device so that the individual evaluation and control units each receive the output signals from at least two sensor elements, which are associated with evaluation and control units of different control devices, and prepare them for evaluation.

In addition, a multi-circuit braking system, in particular for a highly-automated or autonomous vehicle, having a plurality of wheel brakes, which are each arranged on a vehicle wheel, such a sensor assembly, which detects at least one physical variable of the vehicle wheels, a primary control device, which executes at least one braking function of the vehicle based upon the detected at least one physical variable of the vehicle wheels, and a secondary control device, which executes at least one braking function of the vehicle based upon the detected at least one physical variable of the vehicle wheels, is proposed.

In the present case, the control device or the primary control device or the secondary control device can be understood to refer to an electrical device which processes or evaluates detected sensor signals. For this purpose, the control device can have at least one evaluation and control unit for receiving and preparing or processing electrical output signals, at least one computing unit for evaluating the processed output signals, at least one memory unit for storing signals or data, at least one interface to a sensor element for reading the output signals or to an actuator for outputting the control signals to the actuator, and/or at least one communications interface for importing or outputting data embedded in a communications protocol. In the present case, the actuators are designed, for example, as solenoid valves or as pressure generators, which can be controlled accordingly by the control device. The at least one interface can be designed as hardware and/or software. In a hardware embodiment, the interfaces can be part of a so-called system circuit, which comprises a wide variety of functions of the control device. Such a system circuit is preferably designed as an application-specific integrated circuit (ASIC). The at least one evaluation and control unit can be designed as an ASIC, for example. However, it is also possible for the interfaces to be separate integrated circuits or at least partially consist of discrete components. In the event of a software embodiment being used, the interfaces can be software modules that are present, for example, on a microcontroller in addition to other software modules. The computing unit can, for example, be a signal processor, a microcontroller or the like, wherein the memory unit can be a flash memory, an EEPROM, or a magnetic memory unit. A computer program product with program code, which is stored on a machine-readable carrier such as a semiconductor memory, a hard disk memory, or an optical memory and is used to carry out the evaluation when the program is executed by the computing unit, is advantageous as well. The two control devices can, in conjunction with a primary actuator system or with a secondary actuator system, carry out different brake functions, such as ABS, ESP, TCS, and/or Hillhold functions (ABS: Anti-lock Braking System, ESP: Electronic Stability Program, TCS: Traction Control System). In this case, the two control devices can thus perform different brake functions during normal operation. It can be provided in the event of a failure of one of the two control devices that the other control device at least partially takes over the braking functions of the failed control device in order to form a corresponding fallback level.

In the present case, the primary actuator system or the secondary actuator system can be understood to refer to a hydraulic and/or electromechanical assembly by means of which the corresponding control and/or regulating processes for an ABS function (ABS: Anti-lock Braking System) or a TCS function (TCS: Traction Control System) or an Electronic Stability Program (ESP) or an automatic parking brake function can be carried out in the braking system for the pressure buildup or pressure reduction in the wheel brakes. To carry out the control and/or regulation processes, the primary actuator system or the secondary actuator system comprises at least one brake pressure generator and a hydraulic valve unit with solenoid valves which, due to the oppositely-acting forces, "magnetic force," "spring force," and "hydraulic force," can usually be held in clear positions. Accordingly, there are the magnetic valve types "normally open" and "normally closed." In addition, bistable solenoid valves are used which can be switched between a "normally open" and a "normally closed" state, wherein such a bistable solenoid valve permanently remains in the respective operating state until the next switchover signal. The brake pressure generator can, in particular, be operated by muscle force, auxiliary force, and/or an external force. "Auxiliary force" refers to an actuation with muscle force assisted by a brake booster. In order to carry out the parking brake function, an electromechanical actuator can be arranged on the vehicle wheels of at least one vehicle axle, and preferably the rear axle, and can be activated or deactivated via corresponding actuation signals.

In the present case, a sensor element can be understood to refer to an electrical component which, in the region of an associated vehicle wheel, directly or indirectly detects a physical variable or a change in a physical variable and preferably converts said variable into an electrical output signal. Such a sensor element can preferably be designed as a rotational speed sensor, wherein corresponding rotational speed information can preferably be determined by scanning a magnetic encoder or a ferromagnetic gear wheel. The magnetic encoder is designed, for example, as a transducer ring with a plurality of magnetic elements, in particular permanent magnets, distributed uniformly over its circumference, which have an alternating magnetic orientation and form a magnetic pole pair. By means of the rotational speed sensor, the magnetic fields of the magnetic elements are detected during a rotation of the transducer ring, wherein, depending upon the magnetic flux of the respective magnetic field detected by an evaluation and control unit, an output current is provided by means of a current interface for further use as rotational speed information. The rotational speed sensors can comprise, for example, a Hall, GMR, AMR, or TMR sensor element (GMR: Giant Magnetoresistance, AMR: Anisotropic Magnetoresistance, TMR: Tunnel Magneto-resistance). In this case, the respective rotational speed sensor can transmit its output signal as a data protocol, such as an AK protocol or I protocol, to the corresponding evaluation and control unit via the current interface. To determine the rotational speed information, the rotational speed sensors detect, for example, magnetic pole pair zero crossings, wherein a so-called "speed pulse" is generated, which represents the actual rotational speed information, with each magnetic pole pair zero crossing, i.e., a sign change of the detected magnetic field strength. The AK protocol comprises the "speed pulse" as rotational speed information and at least one additional piece of rotational speed information as a data word with a plurality of protocol bits. The protocol bits define the data content of the at least one additional piece of rotational speed information. The at least one additional piece of rotational speed information relates, for example, to a direction of rotation information, air gap information, temperature information, pressure information, etc.

The evaluation and control unit can be understood to refer to an electrical circuit, and preferably an application-specific integrated circuit (ASIC), which receives and outputs output signals of sensor elements and outputs them as processed output signals. Thus, a sensor current flowing through the respective sensor element can be modulated with information about a detected measurement variable and transmitted to the associated evaluation and control unit and converted there into a voltage signal which represents the corresponding measurement information. In addition, the individual evaluation and control units can, for example, provide the "speed pulse" representing the actual measurement information as a voltage signal via a point-to-point connection of the at least one evaluation and control unit in a different control device in real time. The evaluation and control unit can have a plurality of interfaces which are part of the evaluation and control unit. However, it is also possible for the interfaces to be separate integrated circuits or at least partially consist of discrete components.

Advantageous improvements of the sensor assembly for a vehicle, which are specified in the disclosure, are possible by means of the measures and developments set out in the disclosure.

It is particularly advantageous that the control devices can each comprise at least one computing unit because in this case the individual evaluation and control units can transmit processed output signals to the at least one computing unit of the corresponding control device. Furthermore, the processed output signals can comprise additional measurement information, e.g., direction of rotation information, air gap information, temperature information, pressure information, etc., and can be transmitted by the individual evaluation and control units to the corresponding computing unit. The individual computing units can evaluate the processed output signals for performing the corresponding at least one braking function of the vehicle.

In an advantageous embodiment of the sensor assembly, the at least one physical variable can represent a movement-dependent measured variable and/or another measured variable of the corresponding vehicle wheel. The movement-dependent measured variable can represent, for example, a number of revolutions and/or rotational speed and/or a direction of rotation. The at least one other measured variable of the corresponding vehicle wheel can represent, for example, a temperature and/or a tire pressure.

In a further advantageous embodiment of the sensor assembly, the computing units can generate measurement data of the individual vehicle wheels based upon the processed output signals and provide a data bus for distribution in the vehicle. The data bus can, for example, be a CAN bus system or an Ethernet or a Flexray. Other suitable networks or a combination of the named networks in the vehicle can, of course, also be used for distributing the measurement data.

In a further advantageous embodiment of the sensor assembly, the individual sensor elements can each be designed as standard rotational sensors. This allows for a particularly cost-effective implementation of the sensor assembly according to the disclosure.

In a further advantageous embodiment of the sensor assembly, a first control device of the at least two control devices and a second control device of the at least two control devices can each comprise two evaluation and control units. In this case, a first evaluation and control unit of the two control devices can be associated with the vehicle wheels of a first vehicle axle. In addition, a second evaluation and control unit of the two control devices can be associated with the vehicle wheels of a second vehicle axle. Furthermore, the first evaluation and control units of the two control devices associated with the vehicle wheels of the first vehicle axle and the second evaluation and control units of the two control devices associated with the vehicle wheels of the second vehicle axle can each exchange the received output signals of the associated sensor elements with one another.

In a further advantageous embodiment of the sensor assembly, the evaluation and control units of the two control devices can transmit the received output signals of the associated sensor elements to at least one further control device.

In a further advantageous embodiment of the sensor assembly, the control devices can each have a redundant energy supply. As a result, the evaluation and transmission of the output signals and the associated vehicle functions can also be carried out in the event one of the energy supplies fails.

In a further advantageous embodiment of the sensor assembly, the first control device can be designed as a primary control device and control an ESP system or an ESP system with a vacuum-independent, electrohydraulic brake booster. The second control device can be designed as a secondary control device and can control a vacuum-independent, electrohydraulic brake booster or a redundant brake unit. The at least one further control device can be a drive control device, which is designed to control an inverter of an electric drive of the vehicle, or a central control device, which is designed to calculate movement trajectories.

In embodiments of the sensor assembly and of the multi-circuit braking system having such a sensor assembly, the output signals and the processed output signals of three sensor elements are, in the event of a failure of one of the evaluation and control units, still available in both control devices for evaluation purposes. In the event of a failure of one of the computing units in one of the control devices, the output signals and the processed output signals of the four sensor elements are still available for evaluation purposes in the other of the two control devices. In the event of a failure of one of the four sensor elements, the output signals and the processed output signals of the three other sensor elements continue to be available for evaluation purposes in both control devices.

One embodiment of the disclosure is illustrated in the drawings and explained in more detail in the following description. In the drawing, identical reference signs denote components or elements which perform the same or analogous functions.

BRIEF DESCRIPTION OF THE DRAWINGS

FIG. 1 is a schematic block diagram of an embodiment of a sensor assembly according to the disclosure for a vehicle.

DETAILED DESCRIPTION

As can be seen from FIG. 1, the illustrated embodiment of a sensor assembly 1 according to the disclosure for a vehicle comprises at least two control devices ECU1, ECU2, which each comprise at least one evaluation and control unit 10, 10A, 10B, 10C, 10D and a plurality of sensor elements DF1, DF2, DF3, DF4 which are each associated with a brakeable vehicle wheel R1, R2, R3, R4 and one of the evaluation and control units 10A, 10B, 10C, 10D of the control devices ECU1, ECU2 and are designed to detect at least one physical variable of the associated vehicle wheel R1, R2, R3, R4 and to output said variable directly to the associated evaluation and control unit 10A, 10B, 10C, 10D as an output signal AS1, AS2, AS3, AS4. The control devices ECU1, ECU2 execute at least one braking function of the vehicle 1 based upon the detected, movement-dependent, physical variables of the vehicle wheels R1, R2, R3, R4. The individual evaluation and control units 10A, 10B, 10C, 10D each output the received output signal AS1, AS2, AS3, AS4 respectively to at least one evaluation and control unit 10A, 10B, 10C, 10D of another control device ECU1, ECU2 so that the individual evaluation and control units 10A, 10B, 10C, 10D each receive the output signals AS1, AS2, AS3, AS4 from at least two sensor elements DF1, DF2, DF3, DF4, which are associated with evaluation and control units 10A, 10B, 10C, 10D of different control devices ECU1, ECU2, and prepare them for evaluation.

As can be further seen from FIG. 1, the sensor assembly 1 in the illustrated embodiment comprises two control devices ECU1, ECU2 and four sensor elements DF1, DF2, DF3, DF4 designed as standard rotational speed sensors. In this case, a first sensor element DF1 is associated with a first vehicle wheel R1 of a first vehicle axle VA—here, the front axle—and a first evaluation and control unit 10A of a first control device ECU1. A second sensor element DF2 is associated with a first vehicle wheel R2 of a second vehicle axle HA—here, the rear axle—and a second evaluation and control unit 10B of the first control device ECU1. A third sensor element DF3 is associated with a second vehicle wheel R3 of the second vehicle axle HA and a second evaluation and control unit 10C of a second control device ECU2. A fourth sensor element DF4 is associated with a second vehicle wheel R4 of the first vehicle axle VA and a first evaluation and control unit 10D of the second control device ECU2. Thus, in the embodiment shown, the first evaluation and control units 10A, 10D of the two control devices ECU1, ECU2 are associated with the vehicle wheels R1, R4 of the first vehicle axis VA, and the second evaluation and control units 10B, 10C of the two control devices ECU1, ECU2 are associated with the vehicle wheels R2, R3 of the second vehicle axle HA.

As can be further seen from FIG. 1, the two control devices ECU1, ECU2 in the embodiment shown each comprise a computing unit 3, 3A, 3B, wherein the first control device ECU1 comprises a first computing unit 3A, and the second control device ECU2 comprises a second computing unit 3B. In addition, the two control devices ECU1, ECU2 each have a redundant power supply (not shown).

As can further be seen from FIG. 1, the first evaluation and control unit 10A of the first control device ECU1 transmits the received output signal AS1 of the first sensor element DF1 to the first evaluation and control unit 10D of the second control device ECU2, and the first evaluation and control unit 10D of the second control device ECU2 transmits the received output signal AS4 of the fourth sensor element DF4 to the first evaluation and control unit 10A of the first control device ECU1. Thus, the first evaluation and control units 10A, 10D of the two control devices ECU1, ECU2 each receive the output signals AS1, AS4 of the first sensor element DF1 and of the fourth sensor element DF4, which are associated with the vehicle wheels R1, R4 of the first vehicle axle VA. Furthermore, both evaluation and control units 10A, 10D produce the output signals AS1, AS4 of the first sensor element DF1 and of the fourth sensor element DF4, wherein the first evaluation and control unit 10A of the first control device ECU1 transmits the processed output signals AAS1, AAS4 to the first computing unit 3A of the first control device ECU1 for evaluation purposes.

The first evaluation and control unit 10D of the second control device ECU2 transmits the processed output signals AAS1, AAS4 to the second computing unit 3B of the second control device ECU2 for evaluation purposes.

As can further be seen from FIG. 1, the second evaluation and control unit 10B of the first control device ECU1 transmits the received output signal AS2 of the second sensor element DF2 to the second evaluation and control unit 10C of the second control device ECU2, and the second evaluation and control unit 10C of the second control device ECU2 transmits the received output signal AS3 of the third sensor element DF3 to the second evaluation and control unit 10B of the first control device ECU1. Thus, the second evaluation and control units 10B, 10C of the two control devices ECU1, ECU2 each receive the output signals AS2, AS3 of the second sensor element DF2 and the third sensor element DF3, which are associated with the vehicle wheels R2, R3 of the second vehicle axle HA. Furthermore, both evaluation and control units 10B, 10C process the output signals AS2, AS3 from the second sensor element DF2 and the third sensor element DF3, wherein the second evaluation and control unit 10B of the first control device ECU1 transmits the processed output signals AAS2, AAS3 to the first computing unit 3A of the first control device ECU1 for evaluation purposes. The second evaluation and control unit 10C of the second control device ECU2 transmits the processed output signals AAS2, AAS3 to the second computing unit 3B of the second control device ECU2 for evaluation purposes. The two computing units 3A, 3B evaluate the processed output signals AAS1, AAS2, AAS3, AAS4 in order to execute the corresponding at least one braking function of the vehicle.

Of course, a different exchange of the received output signals AS1, AS3; AS2, AS4 of the associated sensor elements DF1, DF2, DF3, DF4 is possible as well. In addition, the received output signals AS1, AS3; AS2, AS4 of the associated sensor elements DF1, DF2, DF3, DF4 can additionally also be transmitted to at least one further control device (not shown) in an alternative embodiment of the sensor assembly 1 (not shown). The at least one further control device is, for example, a drive control device, which is designed to control an inverter of an electric drive of the vehicle 1, or is a central control device, which is designed to calculate movement trajectories.

The sensor elements DF1, DF2, DF3, DF4 each detect at least one physical variable which represents a movement-dependent measured variable and/or another measured variable of the corresponding vehicle wheel R1, R2, R3, R4. In the embodiment shown, the at least one movement-dependent measured variable represents a number of revolutions and a rotational direction. Of course, the physical variable detected can also represent a different movement-dependent measured variable—for example, a rotational speed. In the embodiment shown, the at least one other measured variable of the corresponding vehicle wheel R1, R2, R3, R4 represents a temperature in the surroundings of the sensor element DF1, DF2, DF3, DF4. Of course, the physical variable detected can also represent a different measurement variable such as, for example, a tire pressure or air gap information.

In the exemplary embodiment of the sensor assembly 1 shown, the computing units 3A, 3B each generate measurement data of the individual vehicle wheels R1, R2, R3, R4 on the basis of the processed output signals AAS1, AAS2, AAS3, AAS4 and provide this data to a data bus 5 for distribution in the vehicle.

The described exemplary embodiment of the sensor assembly 1 according to the disclosure for a vehicle, which detects at least one physical variable of the vehicle wheels R1, R2, R3, R4, is preferably used in a multi-circuit braking system, and in particular for a highly-automated or autonomous vehicle. Such a multi-circuit braking system comprises a plurality of wheel brakes (not shown), each of which is arranged on a vehicle wheel R1, R2, R3, R4, a primary control device PSG, which executes at least one braking function of the vehicle based upon the at least one detected physical variable of the vehicle wheels R1, R2, R3, R4, and a secondary control device SSG, which executes at least one braking function of the vehicle based upon the at least one detected physical variable of the vehicle wheels R1, R2, R3, R4. In this case, the first control device ECU1 is designed as a primary control device PSG, and the second control device ECU2 is designed as a secondary control device SSG.

In this case, the primary control device PSG can control an ESP system or an ESP system with a vacuum-independent, electrohydraulic brake booster or an integrated braking system (IPB). The secondary control device SSG can control a vacuum-independent, electrohydraulic brake booster or a redundant brake unit.

The primary control device PSG and the secondary control device SSG receive the output signals AS1, AS3; AS2, AS4 of the associated sensor elements DF1, DF2, DF3, DF4 in real time for further evaluation purposes and for performing the corresponding brake functions, or for carrying out the primary stabilization of the vehicle or the secondary stabilization of the vehicle in an emergency when the primary stabilization has failed. In order to carry out the corresponding brake functions and the primary stabilization of the vehicle, the primary control device PSG controls a corresponding primary actuator system (not shown), via which a pressure buildup or pressure reduction in the wheel brakes can be carried out in the braking system, and corresponding control and/or regulating processes can be carried out. In order to carry out the corresponding brake functions and the secondary stabilization of the vehicle, the secondary control device PSG controls a corresponding secondary actuator system (not shown), via which a pressure buildup or pressure reduction in the wheel brakes can be carried out in the braking system, and corresponding control and/or regulating processes can be carried out. To carry out a parking brake function, at least one of the two control devices ECU1, ECU2 is electrically connected to a corresponding actuator (not shown in more detail) of an electric parking brake via an electrical connection. Preferably, the actuators of the parking brake function are arranged on the vehicle wheels R2, R3 of the second vehicle axle HA or the rear axle. In an alternative embodiment of the sensor assembly 1—not shown—the actuators of the electric parking brake are additionally or alternatively arranged on the vehicle wheels R1, R4 of the first vehicle axle VA or the front axle.

The invention claimed is:

1. A sensor assembly for a vehicle, comprising:
a first control device including a first evaluation and control unit and a second evaluation and control unit;
a second control device including a third evaluation and control unit and a fourth evaluation and control unit; and
a plurality of sensor elements, each sensor element associated with a respective brakeable vehicle wheel and a respective one of the evaluation and control units to detect at least one physical variable of the respective brakeable vehicle wheel and to output said at least one physical variable directly to the respective evaluation and control unit as an output signal,
wherein the control devices are each configured to carry out at least one braking function of the vehicle based on the detected at least one physical variable; and
wherein (i) the first evaluation and control unit is configured to output the received output signal directly to the third evaluation and control unit, (ii) the second evaluation and control unit is configured to output the received output signal directly to the fourth evaluation and control unit, (iii) the third evaluation and control unit is configured output the received output signal directly to the first evaluation and control unit, and (iv) the fourth evaluation and control unit is configured to output the received output signal directly to the second evaluation and control unit, so that the first, the second, the third, and the fourth evaluation and control units each receive the output signals from at least two sensor elements, which are associated with evaluation and control units of different control devices, and prepare them for evaluation.

2. The sensor assembly according to claim 1, wherein:
the first control device includes a first computing unit;
the second control device includes a second computing unit;
the first and the second evaluation and control units are further configured to transmit processed output signals to the first computing unit;
the third and the fourth evaluation and control units are further configured to transmit processed output signals to the second computing unit; and
the first and the second computing units are configured to evaluate the processed output signals for performing the corresponding at least one braking function of the vehicle.

3. The sensor assembly according to claim 1, wherein the at least one physical variable represents a movement-dependent measured variable and/or a different measured variable of the respective brakeable vehicle wheel.

4. The sensor assembly according to claim 3, wherein the at least one physical variable is the movement-dependent measured variable in the form of a number of revolutions and/or rotational velocity and/or a rotational direction.

5. The sensor assembly according to claim 2, wherein the first and the second computing units generate measurement data of the individual vehicle wheels based upon the processed output signals and provide a data bus for distribution in the vehicle.

6. The sensor assembly according to claim 1, wherein each of the plurality of sensor elements is configured as a standard rotational speed sensor.

7. The sensor assembly according to claim 1, wherein the respective brakeable vehicle wheel of the first and the third evaluation and control units are associated with brakeable vehicle wheels of a first vehicle axle, and the respective brakeable vehicle wheel of the second and the fourth evaluation and control units are associated with brakeable vehicle wheels of a second vehicle axle.

8. The sensor assembly according to claim 1, wherein the first, the second, the third, and the fourth evaluation and control units are further configured to transmit the received output signals of the associated sensor elements to at least one further control device.

9. The sensor assembly according to claim 8, wherein the at least one further control device is a drive control device configured to control an inverter of an electric drive of the vehicle or is a central control device configured to calculate movement trajectories.

10. The sensor assembly according to claim 1, wherein the first and the second control devices each have a redundant energy supply.

11. The sensor assembly according to claim 1, wherein the first control device is configured as a primary control device and controls an ESP system or an ESP system with a vacuum-independent, electrohydraulic brake booster.

12. The sensor assembly according to claim 1, wherein the second control device is configured as a secondary control device and controls a vacuum-independent, electrohydraulic brake booster or a redundant brake unit.

13. A multi-circuit braking system for a highly-automated or autonomous vehicle, comprising:
   a plurality of wheel brakes which are each arranged on a respective vehicle wheel; and
   a sensor assembly according to claim 1,
   wherein the control device is a primary control device configured to execute at least one braking function of the vehicle based upon the detected at least one physical variable of the respective vehicle wheels, and
   wherein the control device is a secondary control device which executes at least one braking function of the vehicle based upon the detected at least one physical variable of the respective vehicle wheels.

14. The sensor assembly according to claim 1, wherein the plurality of sensor elements includes (i) a first sensor element connected directly to only the first evaluation and control unit, (ii) a second sensor element connected directly to only the second evaluation and control unit, (iii) a third sensor element connected directly to only the third evaluation and control unit, and (iv) a fourth sensor element connected directly to only the fourth evaluation and control unit.

* * * * *